United States Patent
Wang et al.

(10) Patent No.: US 11,476,648 B2
(45) Date of Patent: Oct. 18, 2022

(54) CABLE RADIAL CUTTING SYSTEM AND REACTION FORCE CONE PROCESSING APPARATUS WITH CABLE RADIAL CUTTING SYSTEM

(71) Applicants: STATE GRID HUZHOU POWER SUPPLY COMPANY, Huzhou Zhejiang (CN); STATE GRID ZHEJIANG ELECTRIC POWER CO., LTD. DOUBLE INNOVATION CENTER, Hangzhou (CN)

(72) Inventors: Xiaojian Wang, Huzhou Zhejiang (CN); Zhen Chen, Huzhou Zhejiang (CN); Jing Xu, Huzhou Zhejiang (CN); Weixun Qin, Huzhou Zhejiang (CN); Keqin Ye, Huzhou Zhejiang (CN); Liupei Wei, Huzhou Zhejiang (CN); Yongsheng Xu, Huzhou Zhejiang (CN); Xiaobin Shen, Huzhou Zhejiang (CN); Xuqiang Yang, Huzhou Zhejiang (CN); Xiaoxiao Wu, Huzhou Zhejiang (CN); Jie Chai, Huzhou Zhejiang (CN); Feng Zhou, Huzhou Zhejiang (CN); Xiongzhang Shen, Huzhou Zhejiang (CN); Kai Shen, Huzhou Zhejiang (CN)

(73) Assignees: STATE GRID HUZHOU POWER SUPPLY COMPANY, Huzhou Zhejiang (CN); STATE GRID ZHEJIANG ELECTRIC POWER CO., LTD. DOUBLE INNOVATION CENTER, Hangzhou (CN)

( * ) Notice: Subject to any disclaimer, the term of this patent is extended or adjusted under 35 U.S.C. 154(b) by 196 days.

(21) Appl. No.: 16/950,662

(22) Filed: Nov. 17, 2020

(65) Prior Publication Data

US 2021/0376581 A1    Dec. 2, 2021

(30) Foreign Application Priority Data

May 28, 2020 (CN) .......................... 202010466730.6
May 28, 2020 (CN) .......................... 202020930649.4

(51) Int. Cl.
 *H02G 1/12* (2006.01)
 *F16H 19/04* (2006.01)

(52) U.S. Cl.
 CPC ........... *H02G 1/1265* (2013.01); *F16H 19/04* (2013.01)

(58) Field of Classification Search
 CPC ............. Y10T 83/0267; Y10T 83/0304; Y10T 83/0311; Y10T 83/0319; Y10T 83/0326;
 (Continued)

(56) References Cited

U.S. PATENT DOCUMENTS 5,916,343 A * 6/1999 Huang .................. B26D 1/285
 82/131
6,202,307 B1 * 3/2001 Wrate ..................... B23D 21/08
 30/97

(Continued)

*Primary Examiner* — Phong H Nguyen
(74) *Attorney, Agent, or Firm* — ArentFox Schiff LLP

(57) ABSTRACT

The present disclosure relates to the field of cable processing apparatus and discloses a cable radial cutting system and a reaction force cone processing apparatus with the cable radial cutting system. The cable radial cutting system includes a cutting bracket, a planetary gear set, a first driving piece and a second driving piece which are mounted on the cutting bracket, and a cutting tool driven by the planetary gear set to rotate and move radially, where the first driving piece and the second driving piece jointly drive the planetary gear set to rotate.

14 Claims, 5 Drawing Sheets

(58) Field of Classification Search
CPC .. H02G 1/1265; H02G 1/1248; H02G 1/1253; H02G 1/127; F16H 19/04; F16H 57/08; F16H 57/082
USPC .............. 82/45, 56, 85, 83; 81/9.4, 9.51
See application file for complete search history.

(56) References Cited

U.S. PATENT DOCUMENTS

| | | | | |
|---|---|---|---|---|
| 6,430,793 | B1 * | 8/2002 | Pedersoli | B21C 35/06 |
| | | | | 29/239 |
| 6,829,971 | B1 * | 12/2004 | Huang | B65C 9/0065 |
| | | | | 83/647.5 |
| 2006/0011025 | A1 * | 1/2006 | Chen | B26D 3/16 |
| | | | | 83/13 |

* cited by examiner

CABLE RADIAL CUTTING SYSTEM AND REACTION FORCE CONE PROCESSING APPARATUS WITH CABLE RADIAL CUTTING SYSTEM

CROSS-REFERENCE TO RELATED APPLICATION(S)

This application claims priority to Chinese patent applications No. 202010466730.6 and No. 202020930649.4 filed on May 28, 2020, disclosures of which are incorporated herein by reference in their entireties.

TECHNICAL FIELD

The present disclosure relates to the field of cable processing apparatus, and in particular to a cable radial cutting system and a reaction force cone processing apparatus with the cable radial cutting system.

BACKGROUND

High-voltage direct current power transmission has advantages of high transmission efficiency and low energy loss. Since the high-voltage direct current power transmission is more economical than alternating current power transmission, the high-voltage direct current power transmission is widely used for long-distance or ultra-long-distance power transmission. However, due to the limitation of manufacturing process of a high-voltage cable, a maximum length of a manufactured jointless cable is 10 km. In a case where the ultra-long-distance transmission is to be achieved, a single cable joint needs to be processed to make a plurality of cables be spliced together. Since there are two different insulating materials of cable body insulation and additional insulation at a cable connection, an electric field distribution of the cable connection is different from an electric field distribution of the cable body, causing a certain potential difference between two adjacent points on the same layer of insulation, where the certain potential difference is an axial field strength, i.e., an axial stress. Therefore, an insulating layer close to a conductor connection end is usually cut into a tapered surface, that is, a reaction force cone, and then wrapped with additional winding insulation, so that two ends of the additional winding insulation form stress cone surfaces.

When the reaction force cone is processed, cutting equipment is usually used to process the reaction force cone, however the existing cutting equipment usually can only process the reaction force cone with a fixed size, and the processing requirement for the reaction force cones with different sizes cannot be satisfied.

SUMMARY

The present disclosure provides a cable radial cutting system and reaction force cone processing apparatus with the cable radial cutting system to solve the problem that the existing cutting equipment cannot satisfy the processing requirement for the reaction force cones with different sizes.

A cable radial cutting system is provided, which includes a cutting bracket; a planetary gear set, a first driving piece and a second driving piece which are mounted on the cutting bracket; and a cutting tool driven by the planetary gear set to rotate and move radially; where the first driving piece and the second driving piece jointly drive the planetary gear set to rotate.

Alternatively, the planetary gear set includes a fixed gear driven by the first driving piece to rotate, a planetary carrier fixedly sleeved on the fixed gear, a planetary gear rotatably disposed on the planetary carrier and engaged with the fixed gear, a ring gear engaged with the planetary gear and configured to be driven by the second driving piece to rotate, a tool drive gear driven by the planetary gear to rotate synchronously, and a rack fixed to the cutting tool and engaged with the tool drive gear.

Alternatively, the cable radial cutting system further includes a power input gear fixedly connected to the fixed gear, where an output end of the first driving piece is capable of driving the power input gear to rotate.

Alternatively, the cable radial cutting system further includes a first transmission gear, where the first transmission gear is fixedly connected to the output end of the first driving piece, and the first transmission gear is engaged with the power input gear.

Alternatively, the cable radial cutting system further includes a second transmission gear, where the second transmission gear is fixedly connected to an output end of the second driving piece, and the second transmission gear is engaged with external teeth of the ring gear.

Alternatively, the cable radial cutting system further includes a gear shaft rotatably disposed on the planetary carrier, where the gear shaft is fixedly connected to the planetary gear.

Alternatively, a plurality of gear shafts are provided, and the plurality of gear shafts are evenly distributed on the planetary carrier in a circumferential direction.

Alternatively, the cable radial cutting system further includes a tool mounting base, where the tool mounting base is fixedly mounted on one side of the planetary carrier, the tool drive gear is placed in the tool mounting base, and the cutting tool slides in the tool mounting base in a radial direction.

The present disclosure also provides a reaction force cone processing apparatus, including the above-mentioned cable radial cutting system.

The present disclosure can realize that: through jointly driving the planetary gear set by the first driving piece and the second driving piece to rotate, the planetary gear set is enabled to drive the cutting tool to rotate and move radially according to the requirement, thereby satisfying the cutting processing of reaction force cones with different sizes.

REFERENCE LIST

Figure 1:
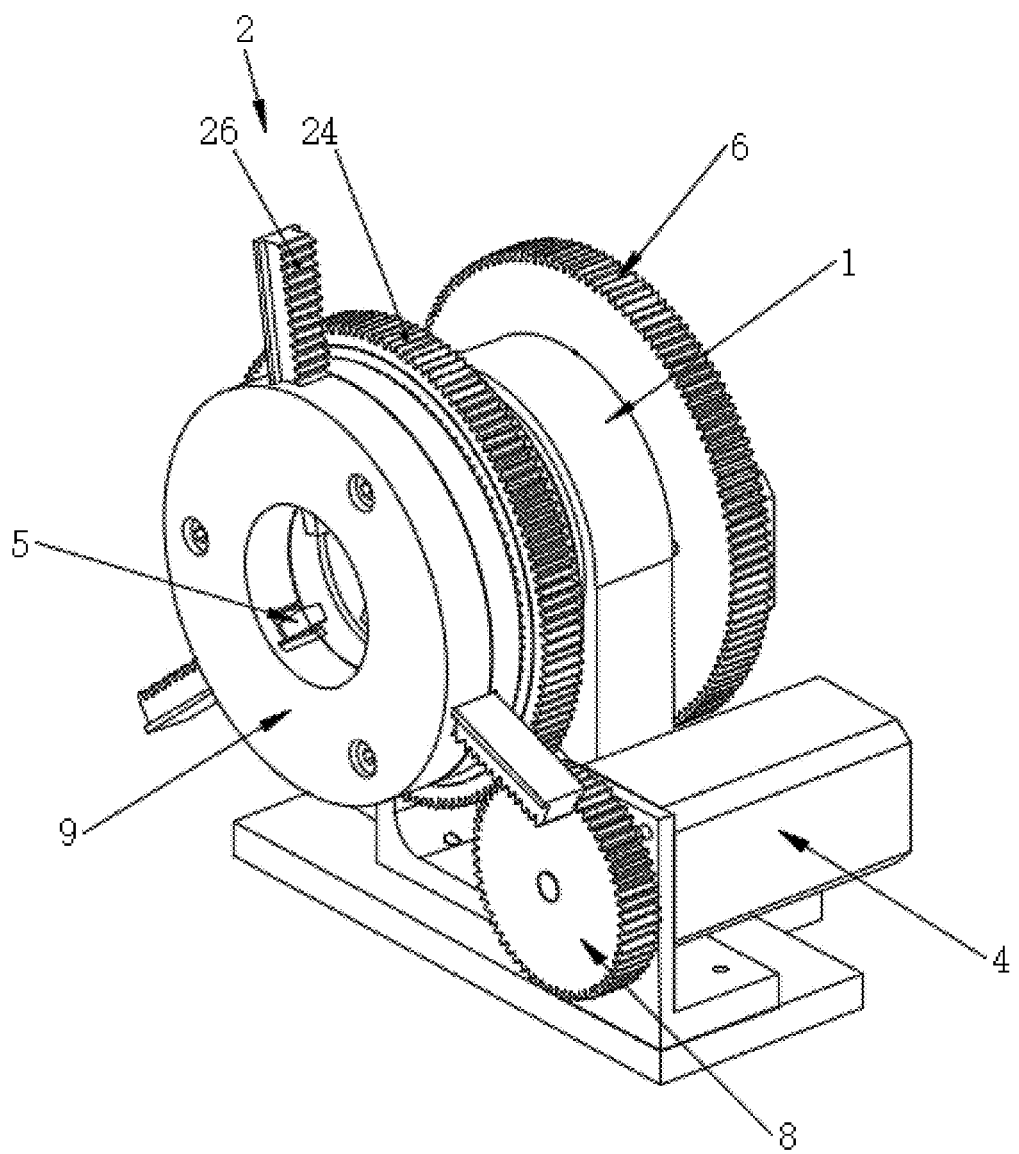
FIG. 1 is a perspective view of a cable radial cutting system according to the present disclosure.
Figure 2:
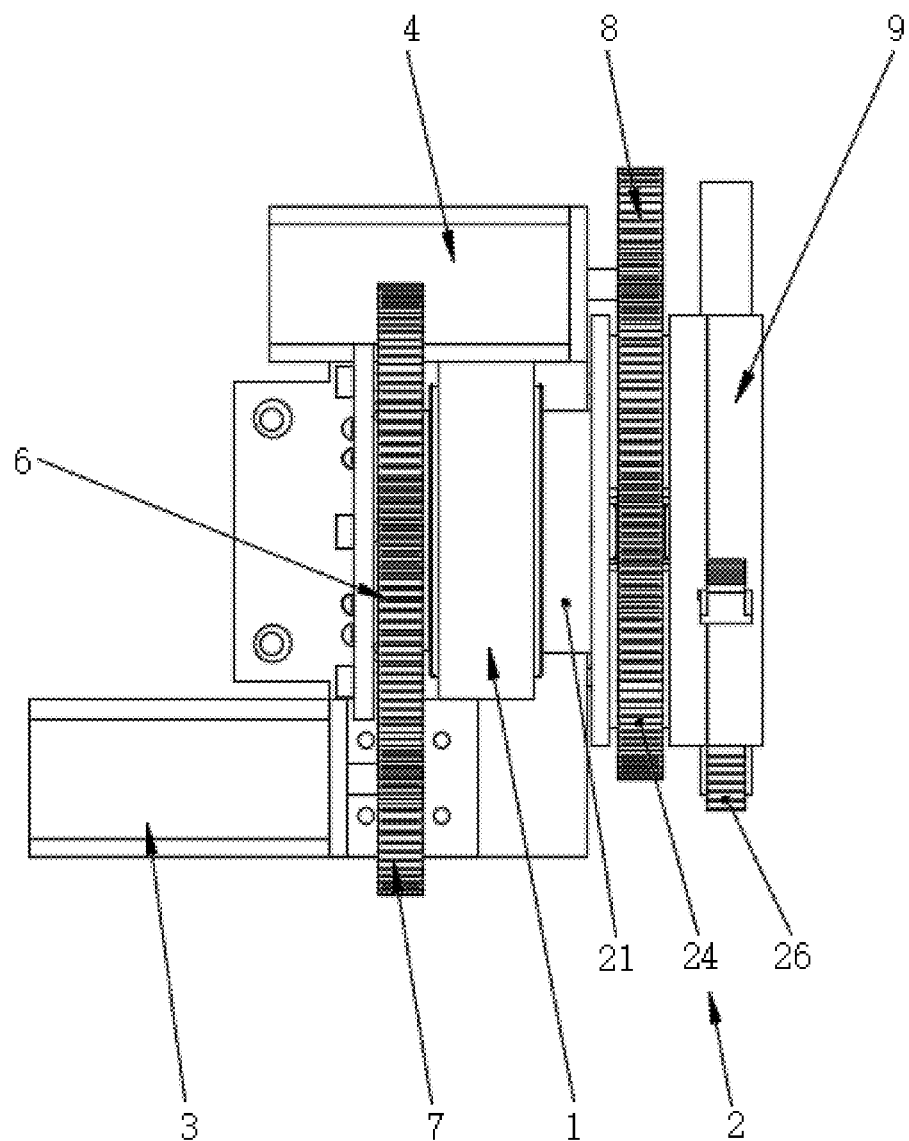
FIG. 2 is a top view of a cable radial cutting system according to the present disclosure.
Figure 3:
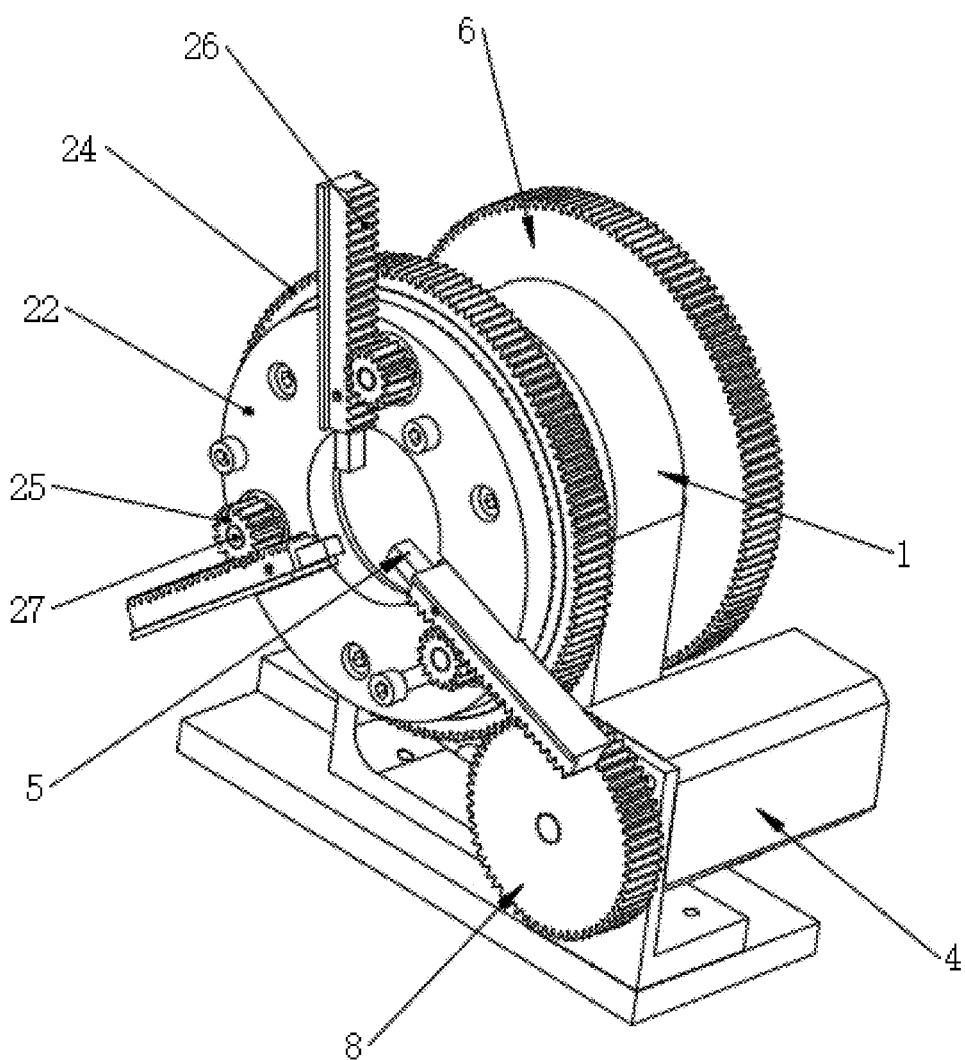
FIG. 3 is a structural view of a cable radial cutting system with a tool drive gear shown according to the present disclosure.
Figure 4:
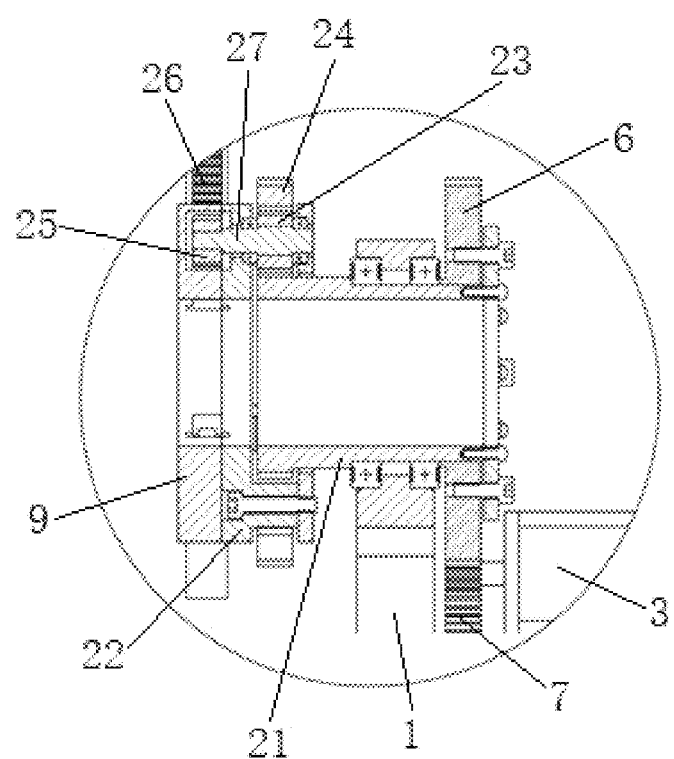
FIG. 4 is a sectional view of a cable radial cutting system according to the present disclosure.
Figure 5:
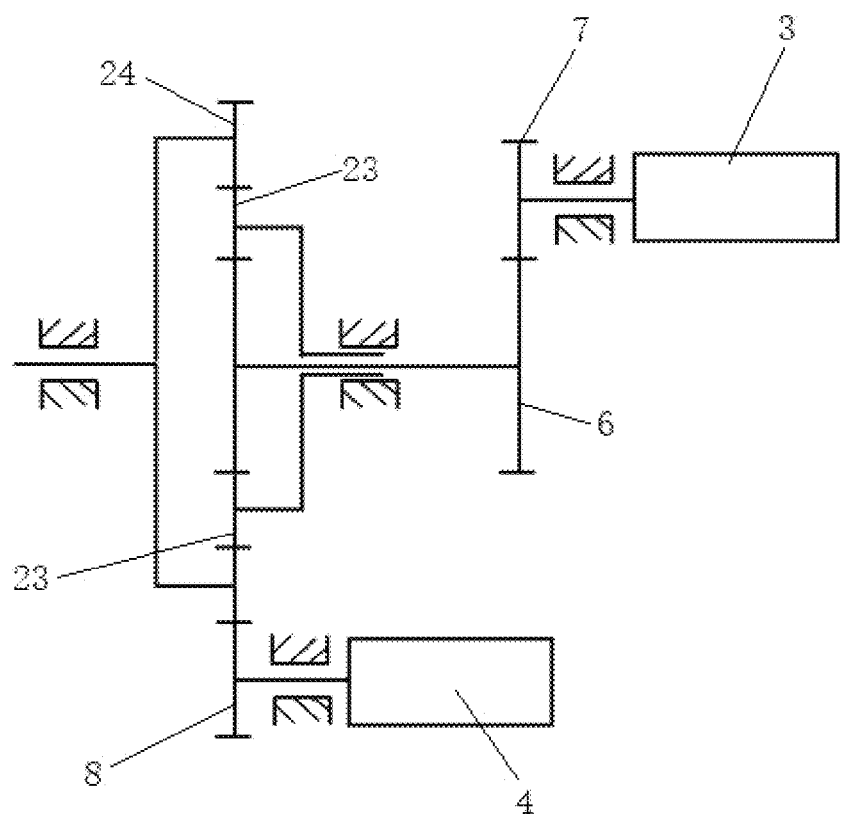
FIG. 5 is a transmission view of a cable radial cutting system according to the present disclosure.

1 cutting bracket
2 planetary gear set
21 fixed gear
22 planetary carrier
23 planetary gear 24 ring gear
25 tool drive gear
26 rack
27 gear shaft
3 first driving piece
4 second driving piece
5 cutting tool
6 power input gear
7 first transmission gear
8 second transmission gear
9 tool mounting base

DETAILED DESCRIPTION

The present disclosure will be further described in detail below with reference to the drawings and embodiments. It should be understood that the embodiments described herein are merely used for explaining the present disclosure, but not to limit the present disclosure.

In the description of the present disclosure, it should be noted that unless otherwise expressly specified and limited, the terms "connected to each other", "connected" and "fixed" are to be construed in a broad sense as securely connected, detachably connected or integrated; mechanically connected or electrically connected; directly connected to each other or indirectly connected to each other via an intermediary; or internally connected between two components or interactional between two components. For those of ordinary skill in the art, specific meanings of the preceding terms in the present disclosure may be understood based on specific situations.

In the present disclosure, unless otherwise expressly specified and limited, when a first feature is described as "on" or "below" a second feature, the first feature and the second feature may be in direct contact, or be in contract via another feature between the two features instead of being in direct contact. Moreover, when the first feature is described as "on", "above" or "over" the second feature, the first feature is right on, above or over the second feature or the first feature is obliquely on, above or over the second feature, or the first feature is simply at a higher level than the second feature. When the first feature is described as "below", "under" or "underneath" the second feature, the first feature is right below, under or underneath the second feature or the first feature is obliquely below, under or underneath the second feature, or the first feature is simply at a lower level than the second feature.

In the description of the embodiment, orientations or position relations indicated by terms such as "upper", "lower" and "right" are based on orientations or position relations shown in the drawings. These orientations or position relations are intended only to facilitate description and simplify operations and not to indicate or imply that a device or element referred to must have such specific orientations or must be configured or operated in such specific orientations. Thus, these orientations or position relations are not to be construed as limiting the present disclosure. In addition, the terms "first" and "second" are used merely for distinguishing in description and have no special meaning.

The present disclosure provides a cable radial cutting system, which can achieve the processing of a reaction force cone and is suitable for processing the reaction force cones with different sizes. As shown in FIG. 1, the cable radial cutting system includes a cutting bracket 1, a planetary gear set 2, a first driving piece 3, a second driving piece 4, and a cutting tool 5. The planetary gear set 2, the first driving piece 3 and the second driving piece 4 are all mounted on the cutting bracket 1, the first driving piece 3 and the second driving piece 4 can jointly drive the planetary gear set 2 to rotate, and the cutting tool 5 can be driven by the planetary gear set 2 to rotate and move radially.

As shown in FIGS. 2 to 5, the planetary gear set 2 includes a fixed gear 21, a planetary carrier 22, a planetary gear 23, a ring gear 24, a tool drive gear 25, and a rack 26.

The fixed gear 21 is rotatably disposed on the cutting bracket 1, and can be driven by the first driving piece 3 to rotate. Alternatively, a first transmission gear 7 may be fixed at an output end of the first driving piece 3, and the first transmission gear 7 is engaged with a power input gear 6. The power input gear 6 is fixedly connected to one end of the fixed gear 21 to drive the fixed gear 21 to rotate at the same speed. In this embodiment, only one end of the fixed gear 21 far away from the power input gear 6 is provided with teeth, and the rest part is a polished rod structure.

The planetary carrier 22 is fixedly sleeved on the fixed gear 21 and can rotate with the fixed gear 21. An outer side of the planetary carrier 22 is provided with a ring groove, and a plurality of rotatable gear shafts 27 are evenly distributed in the ring groove. One planetary gear 23 is fixed on each gear shaft 27, and the planetary gear 23 is engaged with internal teeth of the ring gear 24 and the fixed gear 21 at the same time.

The ring gear 24 can be driven by the second driving piece 4 to rotate. Exemplarily, an output end of the second driving piece 4 may be fixedly connected to a second transmission gear 8, and the second transmission gear 8 is engaged with external teeth of the ring gear 24. The second transmission gear 8 is driven by the second driving piece 4 to rotate, thereby enabling the ring gear 24 to rotate.

The tool drive gear 25 can rotate synchronously with the planetary gear 23. Alternatively, the tool drive gear 25 can be fixed to an end of the gear shaft 27 passing through the planetary carrier 22, and when the ring gear 24 drives the planetary gear 23 to rotate, the planetary gear 23 drives, through the gear shaft 27, the tool drive gear 25 to rotate. It should be understood that, in this embodiment, multiple gear shafts 27 and multiple planetary gears 23 may be provided, and are evenly distributed on the planetary carrier 22 in a circumferential direction.

The tool drive gear 25 can be engaged with the rack 26, and the rack 26 is fixed on the cutting tool 5. When the tool drive gear 25 rotates, the rack 26 can drive the cutting tool 5 to move radially. In this embodiment, the cutting tool 5 is disposed along a radial direction, and when the cutting tool 5 moves in the radial direction, a cutting depth of the cable can be adjusted. The number of cutting tools 5 is the same as the number of racks 26, and the cutting tools 5 and the racks 26 are arranged in the circumferential direction.

Alternatively, in order to better support movement of the cutting tool 5, the cable radial cutting system of this embodiment further includes a tool mounting base 9, the tool mounting base 9 is fixedly mounted on a side of the planetary carrier 22, and the tool drive gear 25 can be placed in the tool mounting base 9. Accordingly, the cutting tool 5 and the rack 26 can slide in the tool mounting base 9 in the radial direction.

In this embodiment, it should be noted that a revolution speed and a rotation speed of the planetary gear 23 are affected by rotational speeds of the ring gear 24 and the fixed gear 21 and the number of gear teeth of a corresponding gear. In a case where modulus of the gear is the same, the rotation speed $n_2$ and the revolution speed $n_H$ of the planetary gear 23, a rotational speed $n_1$ of the ring gear 24, the number $z_1$ of gear teeth, a rotational speed $n_3$ and a gear diameter $z_3$ of the fixed gear 21 satisfy a relationship described below:

$$n_2 = \frac{n_1 z_1 - n_3 z_3}{z_1 - z_3}$$

$$n_H = \frac{n_1 z_1 + n_3 z_3}{z_1 + z_3}.$$

When the rotational speed $n_1$ and the number $z_1$ of gear teeth of the ring gear 24 and the rotational speed $n_3$ and the gear diameter $z_3$ of the fixed gear 21 satisfy $n_1 z_1 = n_3 z_3$, the planetary gear 23 only revolves without rotation. The planetary gear 23 drives the tool drive gear 25 through the gear shaft 27. Since the planetary gear 23 does not rotate, the rack 26 has no displacement in the radial direction, that is, a feed depth of the cutting tool 5 does not change. If the planetary gear 23 has the rotation motion, and finally the feed depth of the cutting tool 5 changes to be adjusted to a required cutting depth. The rotational speed of the first driving piece 3 and the rotational speed of the second driving piece 4 can also be adjusted to adjust and control the revolution speed. The greater the revolution speed, the greater the rotational speed of the cutting tool 5, and the smoother the reaction force cone cut out.

That is, in this embodiment, the feed depth and the rotational speed of the cutting tool 5 can be controlled through a control of the first driving piece 3 and the second driving piece 4, so that the processing apparatus of this embodiment can process reaction force cones with different requirements.

What is claimed is:

1. A cable radial cutting system, comprising:
a cutting bracket;
a planetary gear set;
a first driving piece and a second driving piece which are mounted on the cutting bracket; and
a cutting tool driven by the planetary gear set to rotate and move radially;
wherein the first driving piece and the second driving piece jointly drive the planetary gear set to rotate; and
wherein the planetary gear set comprises a fixed gear driven by the first driving piece to rotate, a planetary carrier fixedly sleeved on the fixed gear, a planetary gear rotatably disposed on the planetary carrier and engaged with the fixed gear, a ring gear engaged with the planetary gear and configured to be driven by the second driving piece to rotate, a tool drive gear driven by the planetary gear to rotate synchronously, and a rack fixed to the cutting tool and engaged with the tool drive gear.

2. The cable radial cutting system according to claim 1, further comprising a power input gear fixedly connected to the fixed gear, wherein an output end of the first driving piece is capable of driving the power input gear to rotate.

3. The cable radial cutting system according to claim 2, further comprising a first transmission gear, wherein the first transmission gear is fixedly connected to the output end of the first driving piece, and the first transmission gear is engaged with the power input gear.

4. The cable radial cutting system according to claim 3, further comprising a second transmission gear, wherein the second transmission gear is fixedly connected to an output end of the second driving piece, and the second transmission gear is engaged with external teeth of the ring gear.

5. The cable radial cutting system according to claim 3, further comprising a gear shaft rotatably disposed on the planetary carrier, wherein the gear shaft is fixedly connected to the planetary gear.

6. The cable radial cutting system according to claim 3, further comprising a tool mounting base, wherein the tool mounting base is fixedly mounted on one side of the planetary carrier, the tool drive gear is placed in the tool mounting base, and the cutting tool slides in the tool mounting base in a radial direction.

7. The cable radial cutting system according to claim 2, further comprising a second transmission gear, wherein the second transmission gear is fixedly connected to an output end of the second driving piece, and the second transmission gear is engaged with external teeth of the ring gear.

8. The cable radial cutting system according to claim 2, further comprising a gear shaft rotatably disposed on the planetary carrier, wherein the gear shaft is fixedly connected to the planetary gear.

9. The cable radial cutting system according to claim 2, further comprising a tool mounting base, wherein the tool mounting base is fixedly mounted on one side of the planetary carrier, the tool drive gear is placed in the tool mounting base, and the cutting tool slides in the tool mounting base in a radial direction.

10. The cable radial cutting system according to claim 1, further comprising a second transmission gear, wherein the second transmission gear is fixedly connected to an output end of the second driving piece, and the second transmission gear is engaged with external teeth of the ring gear.

11. The cable radial cutting system according to claim 1, further comprising a gear shaft rotatably disposed on the planetary carrier, wherein the gear shaft is fixedly connected to the planetary gear.

12. The cable radial cutting system according to claim 11, wherein a plurality of gear shafts are provided, and the plurality of gear shafts are evenly distributed on the planetary carrier in a circumferential direction.

13. The cable radial cutting system according to claim 1, further comprising a tool mounting base, wherein the tool mounting base is fixedly mounted on one side of the planetary carrier, the tool drive gear is placed in the tool mounting base, and the cutting tool slides in the tool mounting base in a radial direction.

14. A reaction force cone processing apparatus, comprising the cable radial cutting system according to claim 1.

* * * * *

UNITED STATES PATENT AND TRADEMARK OFFICE
CERTIFICATE OF CORRECTION

PATENT NO. : 11,476,648 B2
APPLICATION NO. : 16/950662
DATED : October 18, 2022
INVENTOR(S) : Xiaojian Wang et al.

It is certified that error appears in the above-identified patent and that said Letters Patent is hereby corrected as shown below:

On the Title Page

Item (71), second Applicant's address after "Hangzhou" insert -- City --;

Item (73), second Assignee's address after "Hangzhou" insert -- City --.

Signed and Sealed this
Twenty-second Day of November, 2022

Katherine Kelly Vidal
Director of the United States Patent and Trademark Office